United States Patent [19]

Deguchi et al.

[11] Patent Number: 5,298,917
[45] Date of Patent: Mar. 29, 1994

[54] DIGITAL IMAGE FORMING APPARATUS

[75] Inventors: Hiroyuki Deguchi, Osaka; Hirotoshi Tagawa, Kyoto; Toru Taniguchi, Osaka; Hideyuki Tanaka, Hyogo, all of Japan

[73] Assignee: Mita Industrial Co., Ltd., Osaka, Japan

[21] Appl. No.: 849,220

[22] Filed: Mar. 5, 1992

[30] Foreign Application Priority Data

Mar. 8, 1991 [JP] Japan ............................ 3-043081
Mar. 8, 1991 [JP] Japan ............................ 3-043082

[51] Int. Cl.⁵ .......................................... G03G 15/00
[52] U.S. Cl. ........................ 346/160.1; 355/200; 355/210
[58] Field of Search .................. 355/200, 210; 346/160.1

[56] References Cited

U.S. PATENT DOCUMENTS

| | | | |
|---|---|---|---|
| 4,124,289 | 11/1978 | Miyata et al. | 355/208 |
| 4,666,284 | 5/1987 | Yamada | 355/271 |
| 4,685,792 | 8/1987 | Iseki et al. | 355/309 |
| 4,748,481 | 5/1988 | Kunihiro | 355/200 X |
| 4,847,643 | 7/1989 | Ohmori | 346/160 |
| 4,912,563 | 3/1990 | Narita | 355/200 X |
| 5,045,885 | 9/1991 | Nishio | 355/200 X |
| 5,047,801 | 9/1991 | Haneda et al. | 355/200 |
| 5,105,221 | 4/1992 | Takahashi et al. | 355/200 X |

FOREIGN PATENT DOCUMENTS 59-202468 11/1984 Japan.
60-166961 8/1985 Japan.
61-80265 4/1986 Japan.

Primary Examiner—A. T. Grimley
Assistant Examiner—Nestor R. Ramirez
Attorney, Agent, or Firm—Koda and Androlia

[57] ABSTRACT

In a digital image forming apparatus, in which images of a document placed on a document table are read through scanning by a scanner unit and electrostatic latent images are formed on a photosensitive body in accordance with data as for the images of the document by a laser scanning unit (LSU) arranged under the scanner unit, the upper box body which accommodates the document table and the scanner unit can be easily opened upwards relative to the lower box body which accommodates the LSU, centering around a hinge unit provided at the back side thereof. In addition, the laser scanning unit is placed and positioned on a plurality of bar-like members which are in parallel to the drive axis center of the photosensitive body.

1 Claim, 11 Drawing Sheets

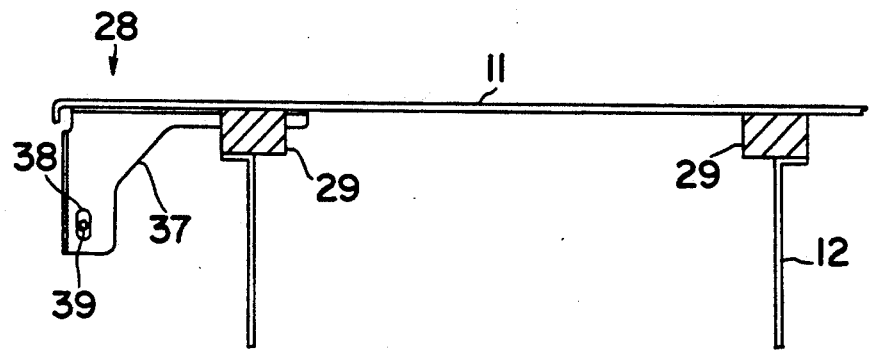
FIG.IIA
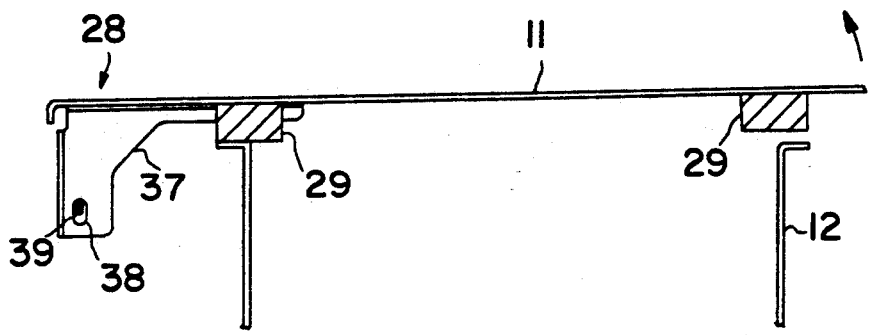
FIG.IIB
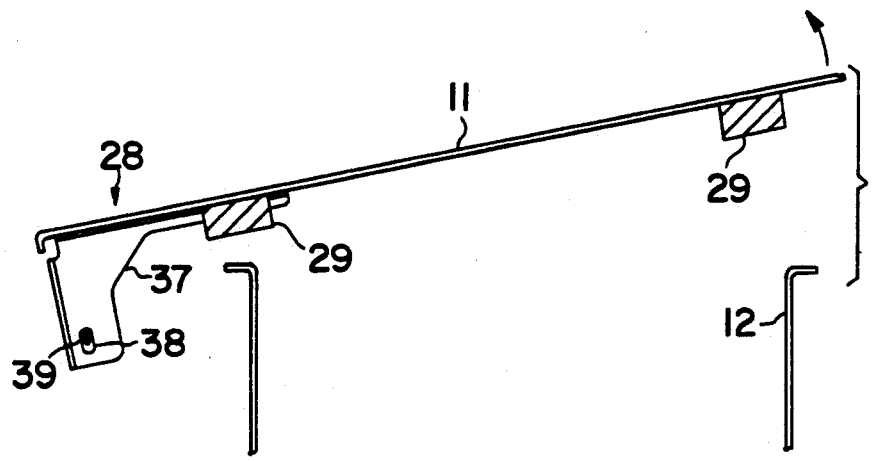
FIG.IIC

DIGITAL IMAGE FORMING APPARATUS

BACKGROUND OF THE INVENTION

1. Field of the Invention

The present invention relates to a digital image forming apparatus which can be preferably used for, for example, a copying machine, a facsimile machine, etc. and especially to a box body construction thereof.

2. Description of the Prior Art

As shown in FIG. 19, in this kind of a conventional digital image forming apparatus, a document (not illustrated) is placed on a document table 2 arranged in an upper box body 1. Thereafter, images of the document are read by scanning the document with a CCD line sensor (not illustrated) which is arranged in the upper box body 1 and constitutes a scanner unit 3. In this case, the scanner unit 3 is driven by a motor (not illustrated) arranged in the upper box body 1.

Data of the document images read as shown above is outputted to a laser scanning unit (hereinafter, laser scanning unit is abbreviated into LSU) 5 arranged in a lower box body 4 on which the upper box body 1 is placed and supported. The LSU 5 is removably placed on a panel 6 fixed to a frame body (not illustrated) in the lower box body 4 with screws. Electrostatic latent images are formed on a photosensitive drum 7 by the LSU 5, based on the data of the above document images. Thereafter, the document images corresponding to the electrostatic latent images are transferred on a sheet of paper (not illustrated).

In this case, the photosensitive drum 7 is arranged under the panel 6 in the frame body and constitutes a printer unit 8, and the photosensitive drum 7 is driven by another motor (not illustrated) arranged in the lower box body 4 independently from the drive source in the upper box body 1 as well as the LSU 5, etc.

And in the digital image forming apparatus, the upper box body 1 is composed with the maintenance efficiency in the lower box body 4 taken into consideration so that it can slide sidewards relative to the lower box body 4.

Hence, in conventional digital image forming apparatuses composed as shown above, it is necessary to make the upper box body 1 slide sidewards relative to the lower box body 4 as described above when carrying out maintenance in the lower box body 4, for example, maintenance of the LSU 5. For this reason, comparatively wide space including space necessary for sliding of the upper box body 1 must be secured as space for installation of the corresponding digital image forming apparatus.

SUMMARY OF THE INVENTION

The present invention has been developed to solve the problems in the prior art.

It is therefore the first object of the present invention to provide a digital image forming apparatus which can be installed in comparatively narrow space by composing it so that the upper box body can be removed from the top of the lower box body in a remarkably compact form when carrying out maintenance, etc. of a LSU in the lower box body. That is, in order to achieve the first object thereof, the first invention is to provide a digital image forming apparatus, in which images of a document placed on a document table are read through scanning by a scanner unit and electrostatic latent images are formed on a photosensitive body in accordance with data as for the images of the document by a laser scanning unit arranged under the scanner unit, and being characterized in that the document table and the scanner unit can be accommodated in an upper box body, the laser scanning unit can be accommodated in a lower box body, and the upper box body can be opened upwards relative to the lower box body centering around a hinge unit provided at the back side thereof.

For example, in a digital image forming apparatus according to the first invention, when carrying out maintenance, etc. of the laser scanning unit accommodated in the lower box body, the upper box body accommodating the document table and the scanner unit can be opened upwards, centering around the hinge unit provided at the back side thereof, relative to the lower box body.

Therefore, when installing the corresponding digital image forming apparatus, useless space can be omitted at the surrounding thereof, and moreover maintenance, etc. of the laser scanning unit can be carried out easily under the installed condition thereof.

Hence, structure to support the upper box body opened up at the lower box body at a constant status is made necessary when the upper box body is made openable relative to the lower box body as described above. For example, with a troublesome supporting structure which needs both hands of an operator to operate for supporting the upper box body, it is inconvenient when the operator must be engaged with another work at the same time. Furthermore, with a supporting structure in which the upper box body may be closed only with simple movement such as an operator touches the upper box body which is opened up, there is a danger for the operator's body to be put between the upper box body and the lower box body.

Therefore, it is the second object of the present invention to provide a digital image forming apparatus in which the upper box body thereof can be simply and securely supported and at the same time the opened-up upper box body can be maintained on a tightly supported status. Namely, in order to achieve the second object thereof, in addition to the construction of the first invention, a digital image forming apparatus comprising a column of which one end is axially supported rotatably on the upper box body, a guide rail provided with a slide groove which, when the upper box body installed on the lower box body is moved in its opening up direction, slidably guides the other end of the column, and is formed a recess engaging with the other end of the column at the opened up position of the upper box body to limit the sliding action of the other end, and energy charging means for elastically charging energy to the column in such direction as the above other end of the column slides in the direction of the recess along the slide groove, is provided.

For example, in a digital image forming apparatus according to the above construction, when the upper box body is opened up centering around the hinge unit installed at the back side relative to the lower box body, the other end of a column of which one end is axially supported rotatably at the upper box body moves along the slide groove of the guide rail, and when the upper box body reaches its opened up position, the other end of the column drops in the recess of the guide rail, and the sliding movement thereof is locked, thereby causing the upper box body to be securely supported relative to the lower box body only with the upper box body raised with a single hand of an operator as the upper box body is supported by the column at its opened up position.

As the column is energy-charged in the direction of recess along the slide groove, it is given energy charged in the same direction after the upper box body is moved by movement for raising it and the movement thereof is locked by the recess. Therefore, even if unprepared external force is given to the locked column, the column can not easily come off from the locked position thereof by aid of gravity of the upper box body, thereby causing the upper box body to be stably supported in its opened up position.

On the other hand, in conventional digital image forming apparatuses, in the case that for example, maintenance, etc. is carried out to a printer unit 8 as the printer unit 8 provided with a photosensitive drum 7, etc. is arranged under a panel 6 which supports a LSU 5, upper area of the printer unit 8 must be opened out by removing the LSU 5 and the panel 6, etc., after the upper box body 1 is made to slide in the lateral direction. For this reason, there exists such a problem as these works are very troublesome.

Furthermore, as the LSU 5 is placed on the panel 6 formed with plate work, which is fixed with screw on the frame body (not illustrated), such a problem as sufficient mounting accuracy of the LSU 5 relative to the photosensitive drum 7 can not be secured.

Hence, it is therefore the third object of the present invention to provide a digital image forming apparatus, in which maintenance efficiency to the printer unit can be improved, comprising a mounting mechanism of laser scanning unit, which can be positioned in precision relative to a photosensitive body. Namely, in order to achieve the third object, the second invention is to provide a digital image forming apparatus, in which images of a document placed on a document table are read through scanning by a scanner unit and electrostatic latent images are formed in accordance with data as for images of the document by a laser scanning unit arranged removably in a frame body on a photosensitive body which is arranged under the laser scanning unit in the corresponding frame body and constitutes a printer unit, and being characterized in that the laser scanning unit is placed and positioned on a plurality of bar-like members installed in parallelism with a drive axis center of the photosensitive body and suitably spaced therefrom in the horizontal direction above the printer unit in the frame body.

For example, in the digital image forming apparatus according to the second invention, space is formed only by removing the laser scanning unit between bar-like members which support the laser scanning unit, and it is possible to easily carry out maintenance to a printer unit located below the laser scanning unit by, for example, an operator as inserting his or her hand through the space.

And as, in the bar-like members, the axial center thereof is assembled to be parallel to the drive axis center of the photosensitive body, machining of the mounting section thereof can be carried out simultaneously with that of the mounting section of the drive axis. Consequently, the machining precision of the mounting section can be improved. And the laser scanning unit can be positioned by the bar-like members attached to the mounting section which has been accurately machined. Therefore, the mounting accuracy of the laser scanning unit relative to the photosensitive body can be improved.

Hence, as the LSU 5 produces large vibrations in operation, the mounting section thereof is liable to be worn. For this reason, with the conventional mount mechanism of the LSU 5 such as direct mounting with screws, the mounting section at the side of LSU 5 is subjected to wearing, and there exists such a problem as the LSU including the worn section thereof must be replaced as a whole.

Therefore, it is the fourth object of the present invention to provide a digital image forming apparatus which can be used for a prolonged term with only the worn section replaced when the mounting section of the laser mount unit has been subjected to wearing. Namely, in order to achieve the fourth object thereof, a digital image forming apparatus being characterized in that the laser scanning unit thereof is positioned and fixed on a plurality of bar-like members by means of engaging members which are fixed with screws at appointed points of the bar-like members in addition to the construction of the second invention is provided.

In the digital image forming apparatus according to the above construction, as the laser scanning unit of which mounting and fixing section is subjected to wearing by vibrations is mounted and fixed to the bar-like members by means of engaging members, wearing due to vibrations is produced mainly at the engaging members. Therefore, when the engaging members are worn, only the engaging members are replaced. As a result, uneconomicality of the case that an expensive laser scanning unit must be replaced can be solved.

This specification specifically points out the subject of the present invention and ends with the claims clearly claimed herein, and it is considered that the present invention is well understood with the ensuing description thereof with reference to the drawings attached hereto.

BRIEF DESCRIPTION OF THE DRAWINGS

FIG. 11 is an explanatory view showing the procedures for opening up the upper box body in the digital image forming apparatus.

DETAILED DESCRIPTION OF THE PREFERRED EMBODIMENTS

Figure 1:
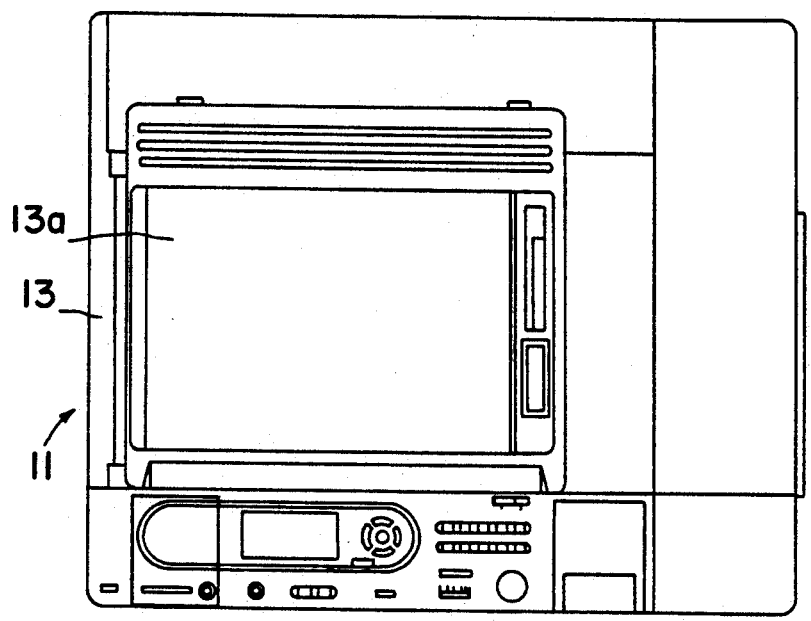
FIG. 1 is a plan view of a digital image forming apparatus according to a preferred embodiment of the present invention.
Figure 2:
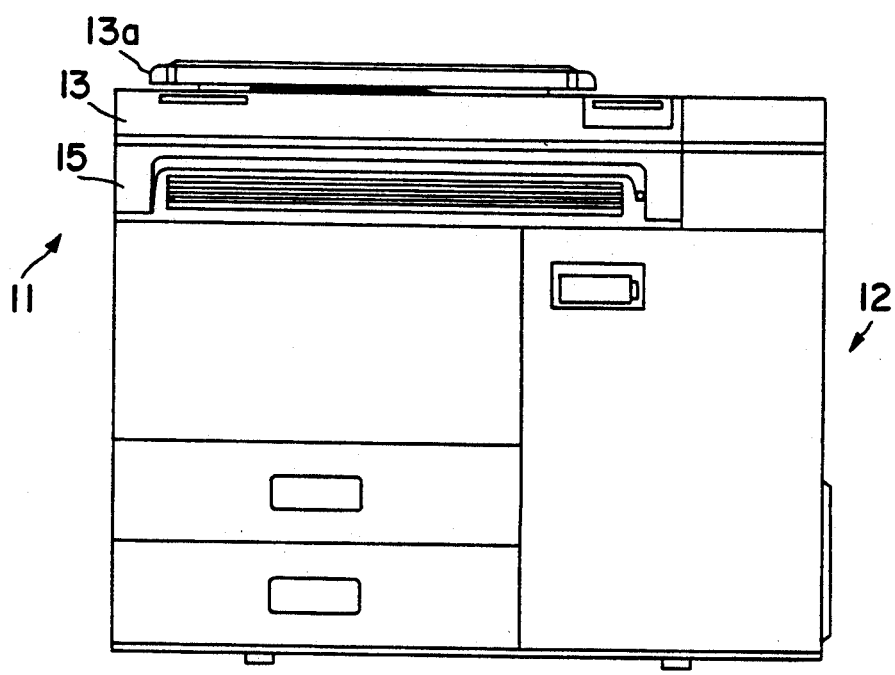
FIG. 2 is a front elevation view of the digital image forming apparatus.
Figure 3:
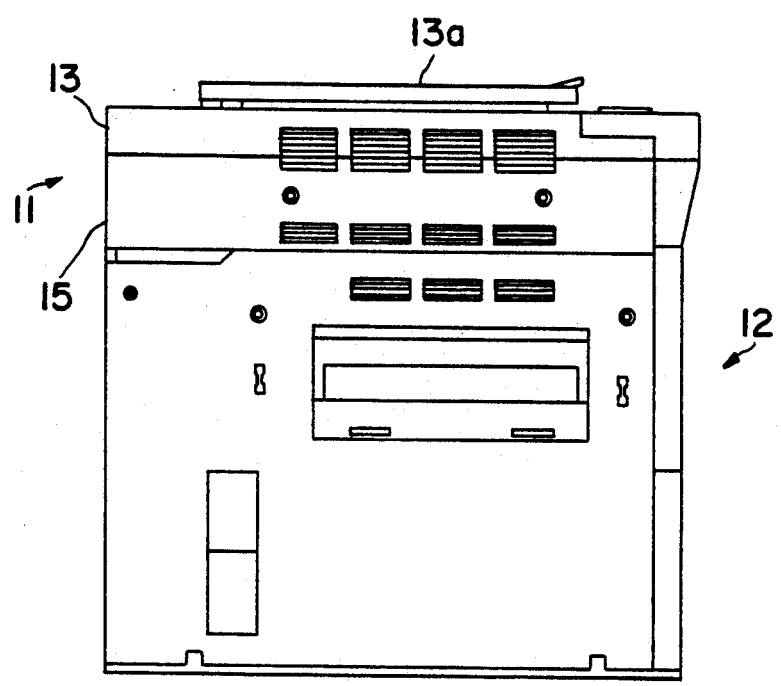
FIG. 3 is a side elevation view of the digital image forming apparatus.
Figure 4:
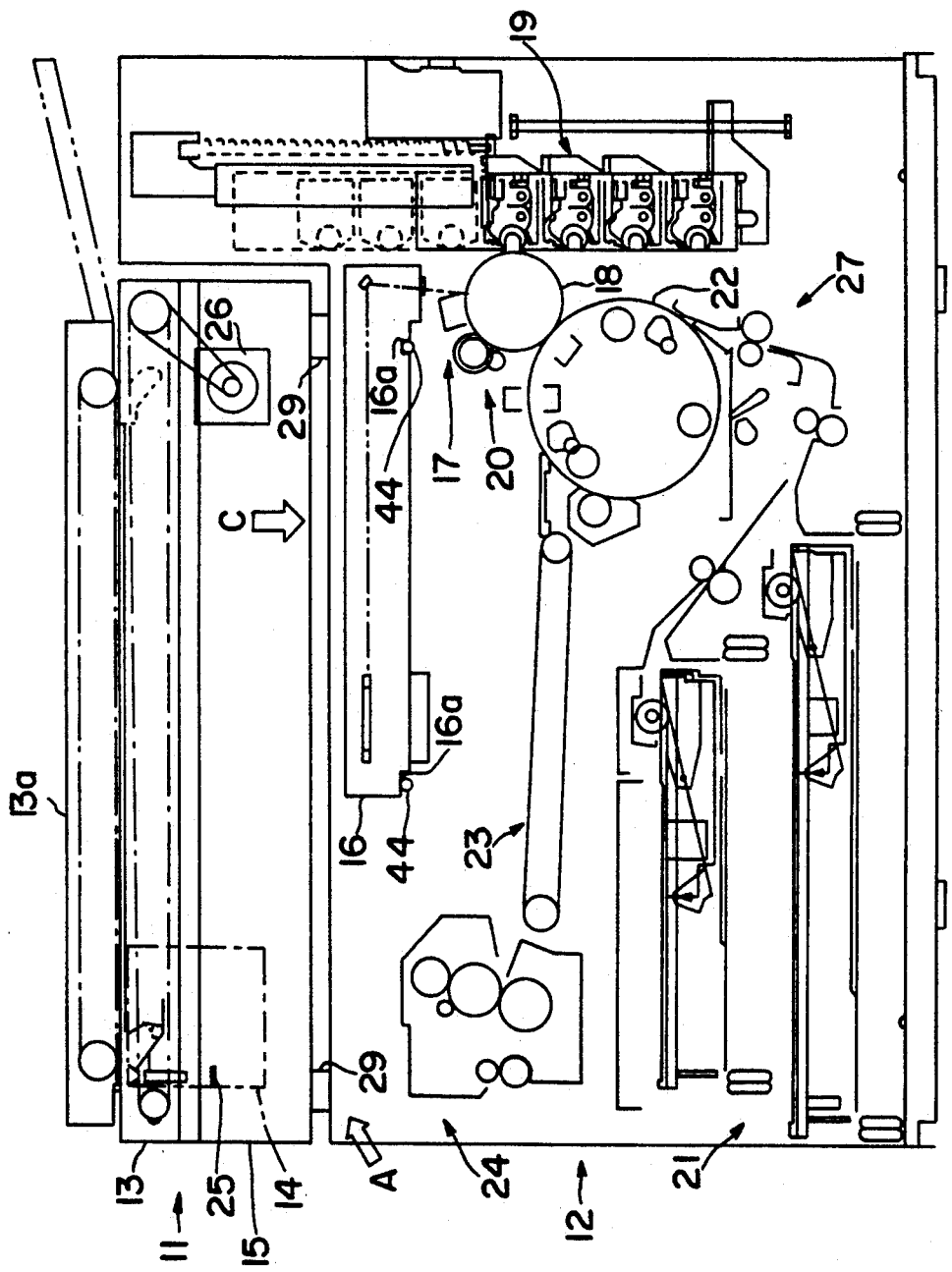
FIG. 4 is an outlined view of the internal construction of the digital image forming apparatus.

As shown in FIG. 1 through FIG. 5, the digital image forming apparatus according to the preferred embodiment is constructed with an upper box body 11 and a lower box body 12 separated. The upper box body 11 comprises a document table 13 provided with, for example, an auto document feeder (ADF) 13a and a scanner unit 15, etc. provided with a scanning/reading unit 14. Furthermore, the lower box body 12 comprises a universal laser scanning unit (LSU) 16, an electrifying unit 17, a photosensitive drum 18, a developing unit 19, a cleaning unit 20, a paper feeding unit 21, a transfer drum 22, a delivery unit 23 and a fixing unit 24, etc. in its internal.

And as a document is fed to an appointed position by the ADF 13a on the document table 13, a CCD line sensor 25 which constitutes the scanning/reading unit 14 is driven by a motor 26 installed in the upper box body 11, and images of the document are scanned and read.

Data of the document images read as shown above is outputted to the LSU 16, and electrostatic latent images are formed on the photosensitive drum 18 by operation of the electrifying unit 17 and the LSU 16 in accordance with the data of the document images.

Electrostatic latent images formed on the photosensitive drum 18 are turned into visible images by operation of the developing unit 19, and the document images which have been turned into visible images are transferred on a transfer paper which is fed from the paper feeding unit 21 onto the transfer drum 22. The transfer paper on which the document images are transferred is sent to the fixing unit 24 by the delivery unit 23 and is delivered out of a copying machine after the document images are processed and fixed by the fixing unit 24.

In the digital image forming apparatus, the printer unit 27 comprises the electrifying unit 17, the photosensitive drum 18, the developing unit 19, the cleaning unit 20, the transfer drum 22, etc.. And the printer unit 27, etc. are driven by a plurality of motors (not illustrated) which are separately installed in the lower box body 12 independently from the motor 26, etc. in the upper box body 11.

And in the above digital image forming apparatus, the upper box body 11 is so installed that it can be opened up upwards relative to the lower box body 12, centering around the hinge unit 28 provided at the back side thereof.

Thereby, when maintenance, etc. is carried out to the LSU 16 in the lower box body 12, the top of the LSU 16 can be exposed only by opening up the front portion of the upper box body 11 upwards. Consequently, the work efficiency for maintenance, etc. can be remarkably improved.

And, in this case, as the upper box body 11 can be opened up as shown above, the corresponding digital image forming apparatus can be installed in a comparatively narrow space in the lateral direction thereof, in comparison with such a type as the upper box body is caused to slide sidewards, and the space over the lower box body is opened as for the conventional apparatuses.

Figure 5:
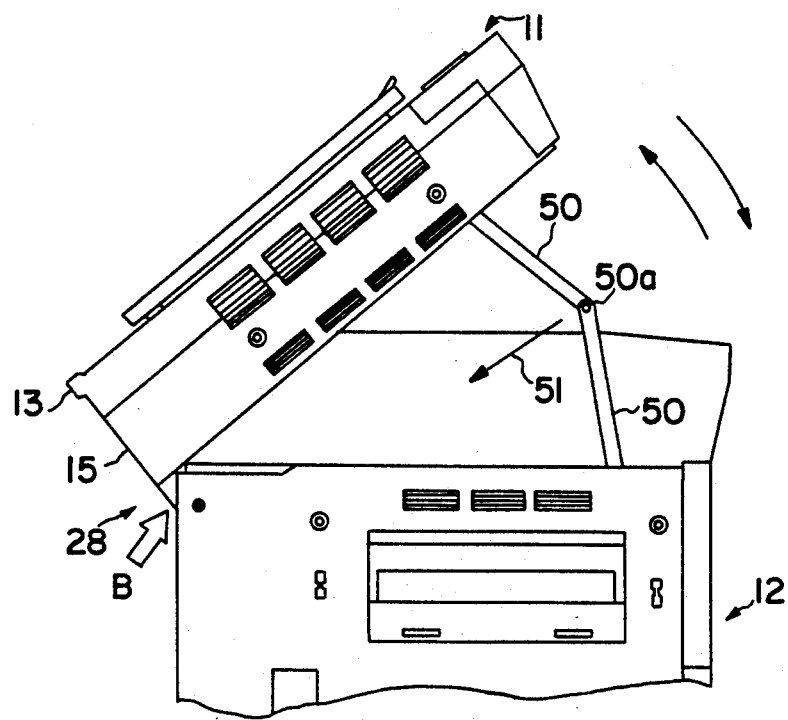
FIG. 5 is a side elevation view showing principal parts with the upper box body opened up in the digital image forming apparatus.

And in the digital image forming apparatus, since the upper box body 11 is supported at the opened up status thereof when the upper box body 11 is opened up relative to the lower box body 12, a column 50 is provided between the upper box body 11 and the lower box body 12 as shown in FIG. 5. The column 50 is provided with a bendable joint 50a at the intermediate position thereof, and both the ends thereof are axially supported rotatably at the upper box body 11 and the lower box body 12, respectively. The column 50 is bent in the direction of an arrow 51 and folded in at the joint 50a with the upper box body 11 placed on the lower box body 12, and when the upper box body 11 is opened up, the column 50 is locked at the position shown in FIG. 5, thereby causing the upper box body 11 to be supported at the opened up position thereof.

Figure 6:
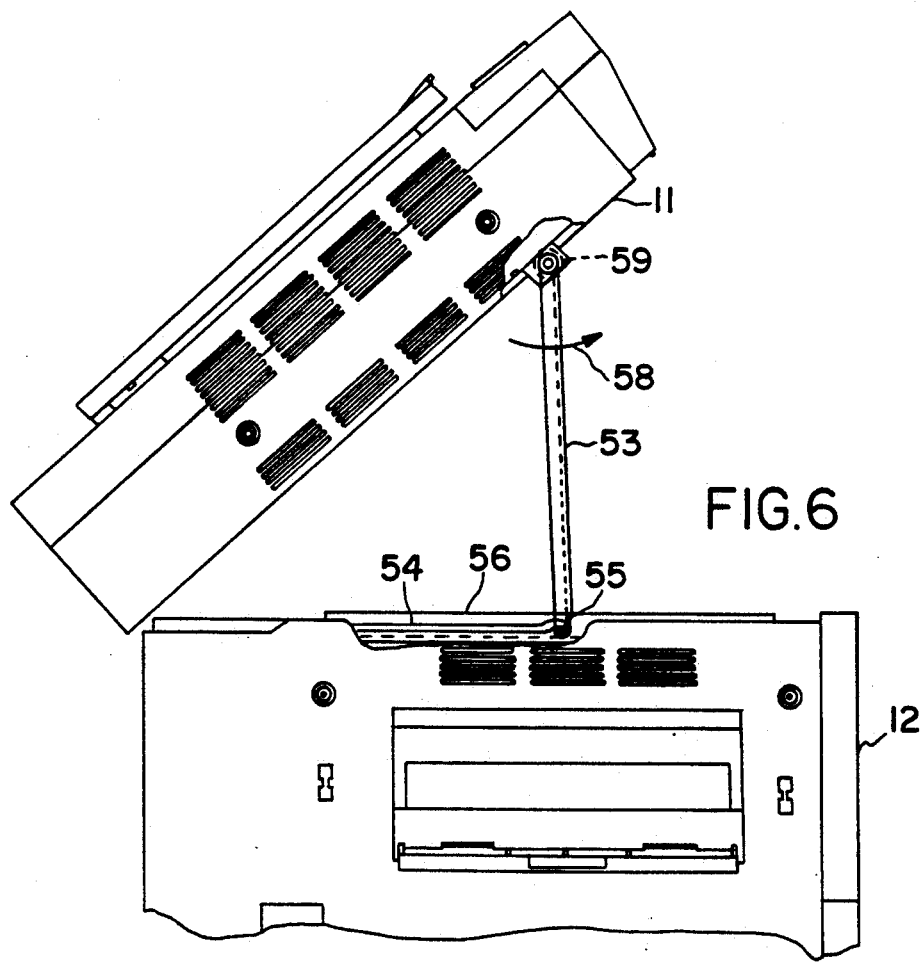
FIG. 6 is a side elevation view of principal parts showing a supporting structure for supporting the upper box body at its opened up position in the digital image forming apparatus.

The upper box body OPEN UP POSITION supporting mechanism for securely supporting the upper box body 11 at the opened up position thereof with a simple operation can be also so composed as adopted in a preferred embodiment shown in FIG. 6.

Figure 7:
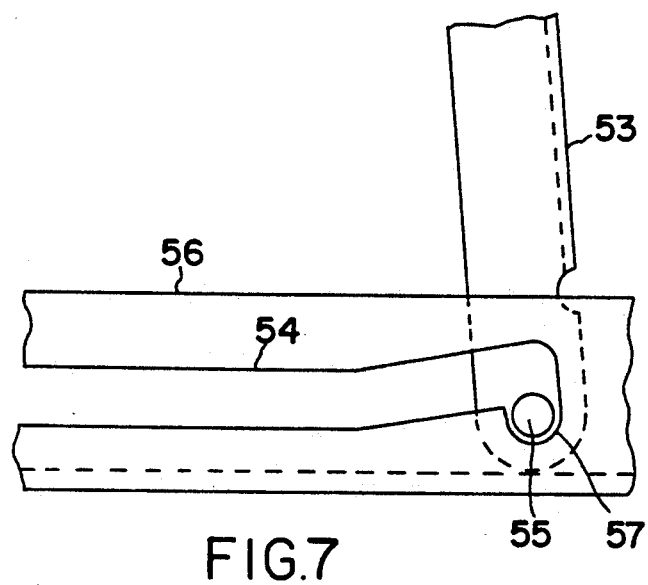
FIG. 7 is a partial construction view showing principal parts of the supporting structure in FIG. 6.

In FIG. 6, one end of the column 53 is axially supported rotatably at the lower part of the upper box body 11. And a guide rail 56, on which a slide groove 54 slidably supporting a slide axis 55 installed at the other end of the column 53 is formed, is arranged at the top of the lower box body 12. The slide axis 55 arranged at the other end of the column 53 slides and moves along the slide groove 54, responsive to the movement of the column 53 which is raised in accompanying with the movement of the upper box body 11 when the upper box body 11 is moved in the opening up direction thereof. As enlarged and shown in FIG. 7, a recess 57 concaved downwards is formed at the end part of the slide groove 55, and the slide axis 55 installed at the other end of the column 53 drops in the recess 57 when the upper box body 11 has been moved to the opening up position thereof, thereby causing the sliding movement of the slide axis 55 to come to a stop.

In the above construction, energy charging means 59 like a helical spring, etc., by which the column 53 is energy-charged in the direction of an arrow 58, is installed at the axial supporting position of the column 53 relative to the upper box body 11, thereby there will be no need to manually move so as to slide the other end of the column 53 along the slide groove 54 when the upper box body 11 is moved in the opening up direction, and the column 53 can be smoothly moved. At the same time, as the slide axis 55 drops and is supported in the recess 57 when the upper box body 11 is fixed at the opened up position thereof, such an event as the slide axis 55 comes off from the recess 57 and the upper box body 11 will not be supported when for example, the column 53 is unpreparedly pushed can be prevented. Therefore, as the upper box body 11 can be supported at the opened up position thereof under a stable status, an operator can carry out maintenance, etc. of LSU 16 in the lower box body 12 with his or her mind at ease.

On the other hand, when the upper box body 11 is got back to the original position (the placing status on the lower box body 12) thereof, the upper box body 11 is raised a little, thereby the slide axis 55 which has dropped in the recess 57 is caused to return to the height position of the slide groove 54. And as the column 53 is manually pushed out on the slide groove 54, the slide axis 55 of the column 53 can slide along the slide groove 54. And when the upper box body 11 is shifted down to the lower box body 12 and is placed thereon, the column 53 is housed between the upper box body 11 and the lower box body 12.

As described above, in the digital image forming apparatus according to the first invention, as the upper box body is opened up, centering around the hinge unit installed at the back side of the upper box body relative to the lower box body when carrying out maintenance, etc. to the laser scanning unit which is housed in the lower box body, the laser scanning unit can be seen only with opening up movement of the upper box body, thereby causing the maintenance, etc. thereof to be easily carried out. Furthermore, as the upper box body is opened up in a remarkably compact form when it is opened up, small space is enough for installation of the corresponding digital image forming apparatus.

Furthermore, according to the digital image forming apparatus pertaining to the second invention, the column for supporting the upper box body, which has been opened up from the lower box body, at the opened up position thereof, causes the guide rail to slide and move with the raising movement of the upper box body and it drops in the recess when the upper box body reaches the opened up position thereof, thereby causing the movement thereof to be locked. Therefore, even when an operator unpreparedly touches the column during work for maintenance, etc. with the upper box body opened up, the supporting lock can be retained in a stable condition with force to charge energy to the column in the direction of the recess and gravity of the upper box body.

On the other hand, in the case that the digital image forming apparatus is used with the upper box body 11 placed on the lower box body 12, elastic members 29(Refer to FIG. 4 and FIG. 8) are intervened and arranged between the upper box body 11 and the lower box body 12, taking it consideration that vibrations produced by drive of the motors provided respectively in the upper box body 11 and the lower box body 12 may not be transmitted to each other.

The elastic member 29 is provided with a fixing bracket 31 mounted with a screw 30 and is attached to the lower side of the upper box body 11 with a screw 32. And the fixing bracket 31 is removably fixed to the lower box body 12 with a screw 33. Therefore, the upper box body 11 can be opened up upwards relative to the lower box body 12 by removing the screw 33.

Figure 8:
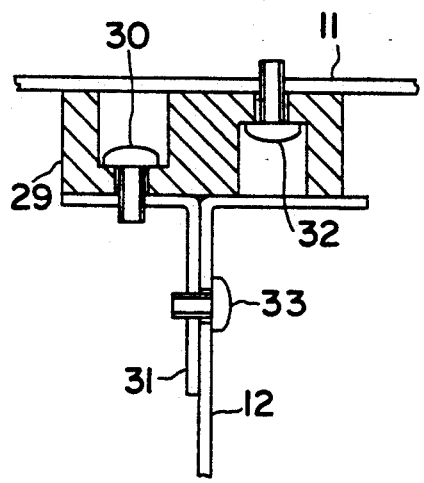
FIG. 8 is a cross sectional view showing the detailed structure of the part shown with an arrow A in FIG. 4.
Figure 9:
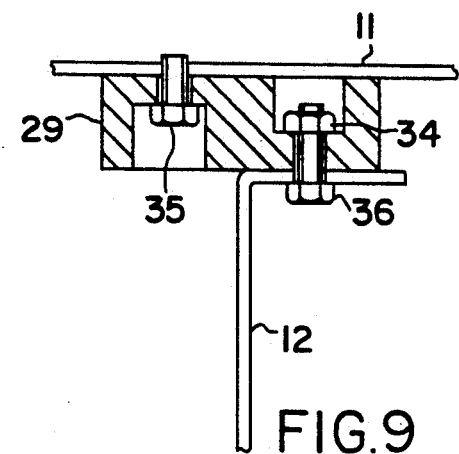
FIG. 9 is a view equivalent to that of FIG. 8, showing another preferred embodiment which is applicable to the part shown with an arrow A in FIG. 4.

Instead of the mounting structure of the elastic member 29 as shown in FIG. 8, such mounting structure as mounting the elastic member 29 according to the type shown in FIG.9 may be adopted.

Namely, in the preferred embodiment shown in FIG. 9, the elastic member 29 is provided with a nut 34 in advance and is fixed to the lower side of the upper box body 11 with a bolt 35. And the bolt 36 is screwed to the nut 34 with the upper box body 11 placed on the lower box body 12 with intervention of the elastic member 29, thereby causing the upper box body 11 to be fixed integrally with the lower box body 12.

Namely, the screws 30, 32, bolts 35, 36 and nut 34 which are used as fixing members for fixing the elastic member 29 to the upper box body 11 or the lower box body 12 are installed in no contact with the upper box body 11 or the lower box body 12, thereby causing the vibration suppressing action by the elastic member 29 to be made secure.

Furthermore, in order to heighten the vibration suppressing action by the elastic members 29, for example, natural rubber, chloroprene rubber, butyl rubber or acrylnitril rubber, etc. are preferable as material of the elastic members 29. Furthermore, in order to obtain effect of accurate positioning of the upper box body 11 relative to the lower box body 12 simultaneously with good vibration suppressing effect secured, it is desirable that for example, each kind of rubber material of which Rockwell hardness is not less than 40 degrees and is not greater than 90 degrees as rubber hardness is used.

As such structure as described is used as placing structure of the upper box body 11 relative to the lower box body 12 is employed, vibrations produced by drive of motors provided in each of the box bodies can be attenuated, and any inconvenience of mutually giving adverse influences, for example, on reading and formation of images due to vibrations can be omitted. As a result, highly precision document images can be obtained on a transfer paper.

Since the upper box body 11 and the lower box body 12 are disengageably fixed to each other with screw members with intervention of the elastic members 29, it is possible to move and transport the digital image forming apparatus under a stable condition.

Inversely of the preferred embodiments shown in FIG. 8 and FIG. 9, such structure that the elastic members 29 are originally fixed to the upper side of the lower box body 12 and disengagement is made between the upper box body 11 and the elastic members 29 when opening up the upper box body 11 may be adopted.

Furthermore, in the case of such structure that the upper box body 11 is connected to the lower box body 12 simply by a hinge unit comprising a pin and a supporting hole in which the pin is inserted, under such a status that vibration suppressing action is brought by placing the upper box body 11 on the lower box body 12 by means of elastic members 29 as described above, the vibration suppressing action by the elastic members 29 may be disturbed since vibrations are mutually transmitted through the hinge unit. Here, in the case that the vibration suppressing action is intended to be secured at the corresponding hinge unit, the hinge unit itself must be of comparatively flexible structure, and the upper box body 11 will not be able to be supported in secure status when it is opened up.

Figure 10:
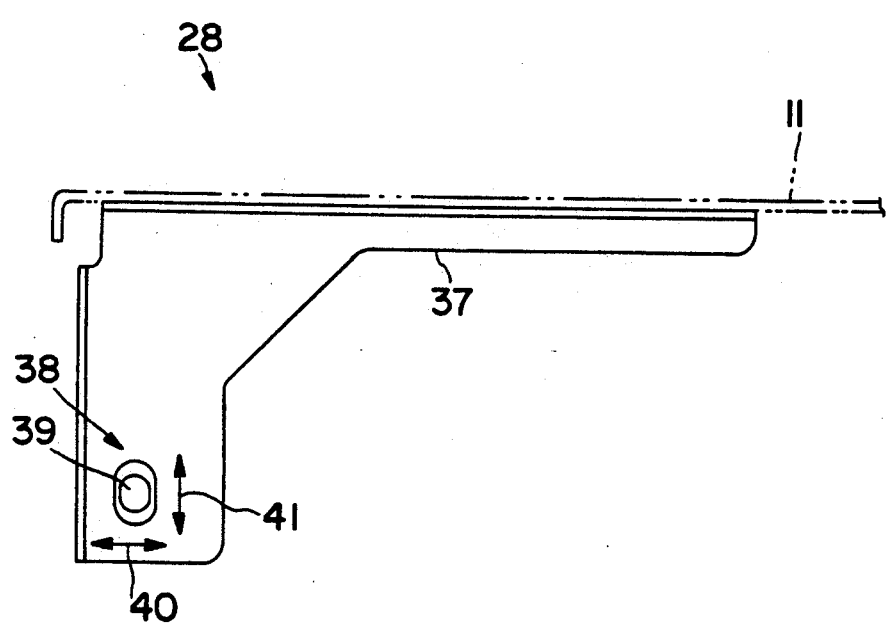
FIG. 10 is a side view of principal parts showing the detailed structure of the part shown with an arrow B in FIG. 5.

Hence, in the structure of the present preferred embodiment, the hinge unit 28 has been designed as follows;

Namely, a bracket 37 formed to be roughly L-shaped, using a flat plate, is attached to the underside of the upper box body 11 at the hinge units 28 as shown in FIG. 5 and FIG. 10. A supporting hole 38 is drilled and provided at one end side of the bracket 37, and a pin 39 attached to the lower box body 12 is freely inserted in the supporting hole 38.

In this case, relative to the width direction of the supporting hole 38 (the direction of an arrow 40) for the outer diameter dimension of the pin 39, the size of the supporting hole 38 is determined so that such clearance as vibrations can not be mutually transmitted through the hinge unit 28 between the upper box body 11 and the lower box body 12 can be obtained under such a condition that the upper box body 11 is placed on the lower box body 12 with intervention of the elastic members 29. And relative to the vertical direction (the direction of an arrow 41) thereof, the size of the supporting hole 38 is larger than the amount of movement of the upper box body 11 in accompanying with the elastic deformation of the elastic members 29 when the upper box body 11 is placed on the lower box body 12, has such clearance that the vibrations can not be transmitted under the placed condition thereof and is set to such slit dimension as can directly support the load of the upper box body 11 by the corresponding hinge unit 28 with the pin 39 engaged with the supporting hole 38 (FIG. 11 (B) and FIG. 11 (C)) in accompanying with the opening up movement when the upper box body 11 is opened up.

At the hinge unit 28 constructed as described above, the pin 39 and the supporting hole 38 are not mutually supported or are out of contact therebetween, as shown in FIG. 11, with the upper box body 11 placed on the lower box body 12 with intervention of the elastic members 29 (refer to FIG. 11 (A)). Consequently, such inconvenience as spoiling effective vibration suppressing action of the elastic members 29 by the corresponding hinge unit 28 can be avoided. On the other hand, in the case that the upper box body 11 is raised and opened up, centering around the hinge unit 28, the pin 39 and the supporting hole 38 are engaged with each other in accompanying with the opening up movement thereof (Refer to FIG. 11 (B) and FIG. 11 (C)). As a result, the upper box body 11 can be supported under stable condition by the hinge unit 28 when opening up and closing the upper box body 11.

Furthermore, in the preferred embodiment, an example in which a bracket 37 is installed at the upper box body 11 and a pin 39 is installed at the lower box body 12 is described. And a hinge unit of such construction as the bracket 37 and the pin 39 are inversely attached against the above example may be employed.

Figure 12:
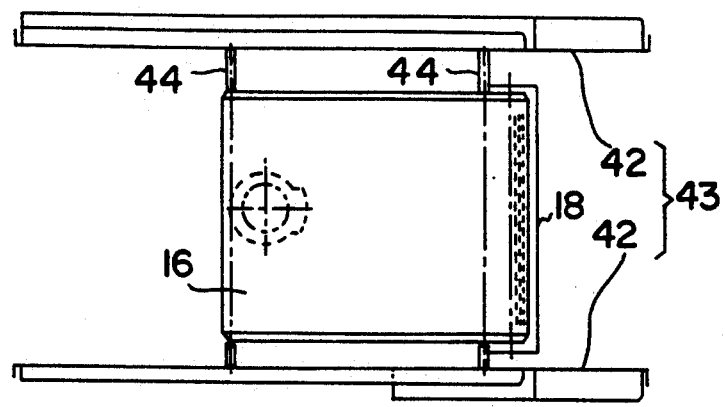
FIG. 12 is a plan view of the part shown with an arrow C in FIG. 4.
Figure 13:
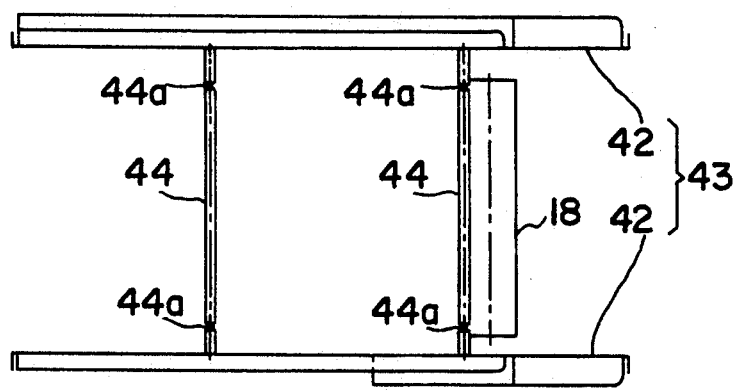
FIG. 13 is a plan view with the laser scanning unit removed, in FIG. 12.
Figure 14:
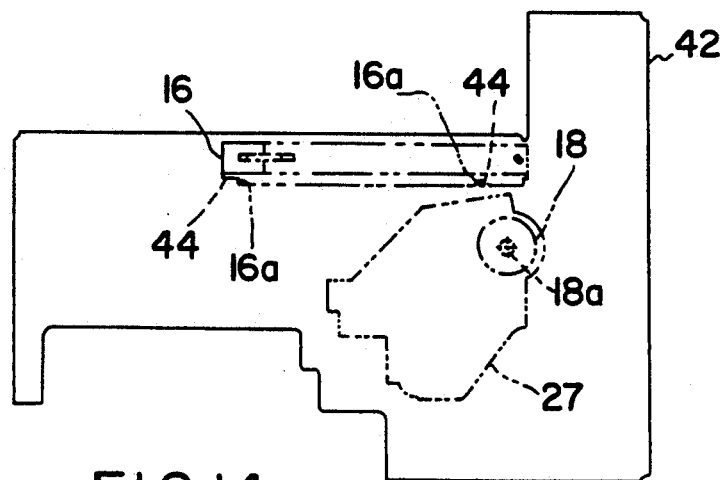
FIG. 14 is a front elevation view of a frame body shown in FIG. 12.

A frame body 43 comprising two side plates 42, 42 arranged in parallelism along with both the side parts of the lower box body 12 is arranged at the interior of the lower box body 12 on which the upper box body 11 is supported as shown above (See FIG. 12, FIG. 13 and FIG. 14). Two bar-like members 44, 44 suitably spaced from each other in the horizontal direction are attached in parallelism with each other at the upper position of the printer unit 27 inside the frame body 43. In this case, the axial center of the bar-like members 44, 44 are set in parallelism with the axial center of the drive axis 18a of the photosensitive drum 18 which constitutes the printer unit 27. Therefore, each of the mounting portions of the bar-like members 44, 44 and the drive axis 18a relative to the side plates 42, 42 can be machined at the same time. As a result, the positional relation of the bar-like members 44, 44 and the drive axis 18a can be finished in high precision.

At an appropriate position of the bar-like member 44, a fitting groove 44a for positioning the LSU 16 is drilled and provided. As a fitting part 16a (See FIG. 14) prepared at the underside of the LSU 16 is fitted and inserted in the fitting groove 44a, the LSU 16 can be disengageably positioned and placed on the bar-like members 44, 44.

Therefore, in the structure of the above preferred embodiment, the LSU 16 can be remarkably positioned relative to the photosensitive drum 18 simply and at a high precision. Consequently, highly precision document images can be obtained.

Figure 15:
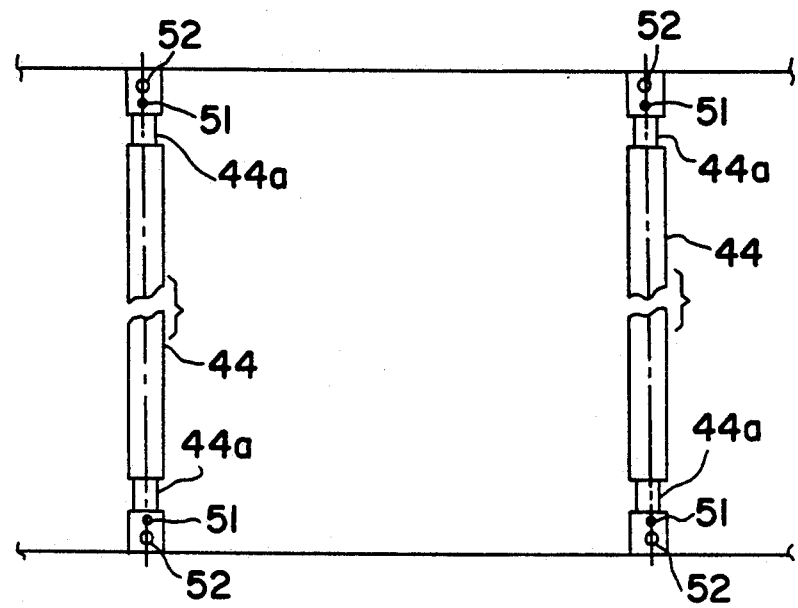
FIG. 15 is an enlarged view of principal parts of FIG. 13.
Figure 16:
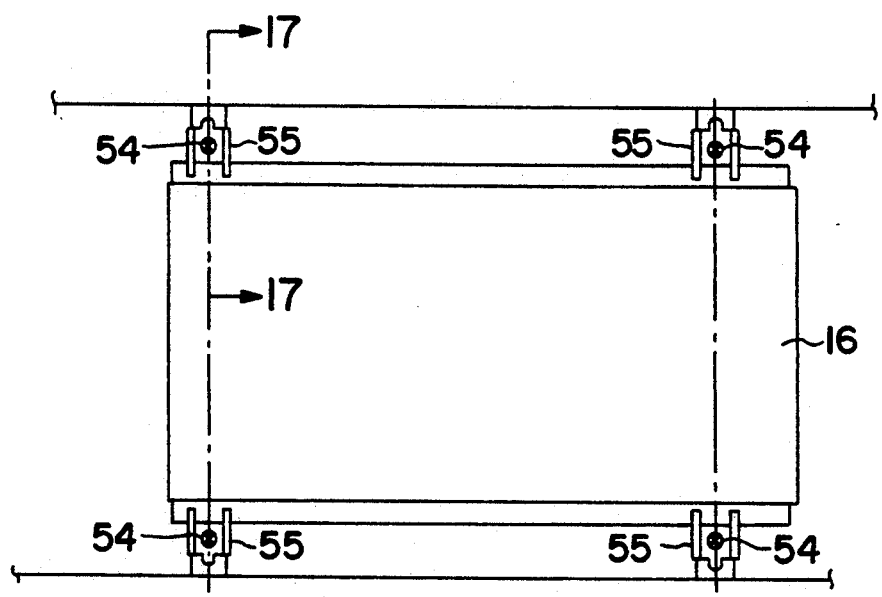
FIG. 16 is a plan view showing the fixed status of the laser scanning unit.
Figure 17:
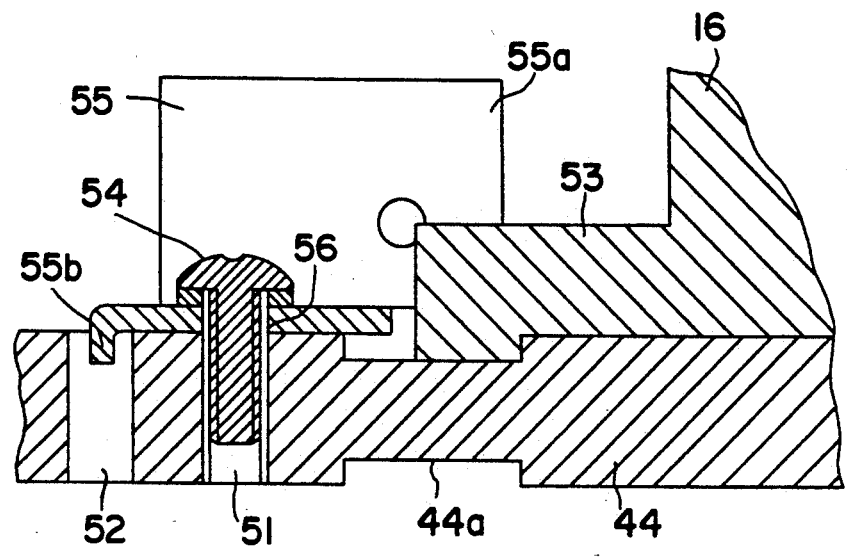
FIG. 17 is a cross sectional view of the part taken along with the line 17—17 in FIG. 16.
Figure 18:
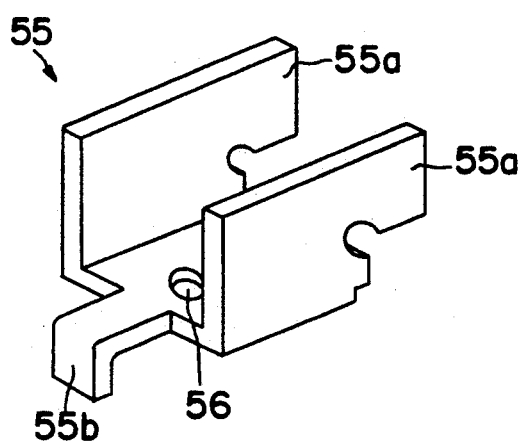
FIG. 18 is a perspective view of engaging member.
Figure 19:
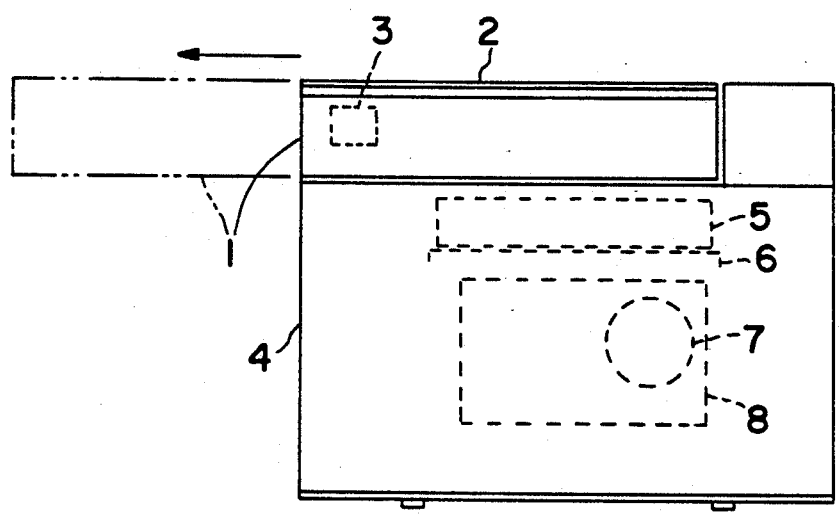
FIG. 19 is for the purpose of explaining the arts in the background of the present invention and is a front elevation view showing the outline of structure of the conventional digital image forming apparatus.

In order to fix the position of the LSU 16 to be placed on the bar-like members 44, 44, a mounting screw hole 51 and positioning hole 52 are respectively installed at both the ends of each of the bar-like members 44, 44 as shown in FIG. 15. After the LSU 16 is positioned and placed at an appointed position on the bar-like members 44, 44, the LSU 16 is positioned and fixed at an appointed position on the bar-like members 44, 44 since the flange unit 53 at the underside of the LSU 16 is pushed by engaging pieces 55a, 55a of one end of the engaging member 55 as shown in FIG. 16 and FIG. 17 and the engaging member 55 is fixed in the mounting screw hole 51 with a bolt 54. The engaging member 55 is formed to be of such shape as shown in FIG. 18. A pair of the engaging pieces 55a, 55a by which the flange unit 53 of the LSU 16 are positioned and fixed are formed at one end of the base unit of the engaging member 55, and a positioning piece 55b to be inserted in the positioning hole 52 of the bar-like member 44 and the mounting hole 56 are provided at the other end of the base unit thereof. As the base of the engaging member 55 is fixed with the bolt 54 after the positioning piece 55b is engaged with the positioning hole 52, the engaging member 55 does not rotate in accompanying with the bolt 54 even though the bolt 54 is screwed. Therefore, the engaging member 55 can be accurately positioned.

On the other hand, when the LSU 16 is positioned on the bar-like members 44, 44 and fixed thereon, such structure as fixing the flange unit 53 with the mounting screw hole 51 directly utilized may be employed. However, the flange unit 53 at the screw-fixing position is subjected to a remarkable wearing in the case that the above construction is employed as the LSU 16 produces large vibrations in operation, and when the screw-fixing position is worn, exceeding a specified level, the LSU 16 as a whole must be replaced. The bar-like members 44, 44 and flange unit 53 which are made of metal are usually subjected to appropriate hardening treatment. To the contrary, as the engaging member 55 is not specially subjected to such hardening treatment even if it is made of metal or as it is made of plastic material, etc., wearing due to vibrations of the LSU 16 is produced mainly at the engaging member 55 since the LSU 16 is positioned and fixed through the engaging member 55 as shown above. For this reason, when the wearing reaches a specified level, it is all right that only the engaging member 55 is replaced. Therefore, there is no need to replace an expensive LSU 16 as a whole and it is remarkably economical, too.

Furthermore, when the LSU 16 is removed for the sake of maintenance, etc., it is not necessary to remove the bolt 54 as a whole. Namely, it is enough to loosen the bolt 54 up to the position where the positioning piece 55b of the engaging member 55 can be removed from the positioning hole 52, thereby causing the engaging member 55 to be rotated, centering around the bolt 54. As the engaging member 55 is rotated to the position where the engaging status between the engaging piece 55a and the flange unit 53 is released, the LSU 16 is removed from the bar-like members 44, 44. Accordingly, it is possible to easily carry out removal and mounting of the LSU 16.

Furthermore, as the engaging pieces 55a, 55a are provided in the vertical direction as a pair at both the sides of the mounting hole 56, the rigidity thereof is high and the load thereof is uniformly distributed to the flange unit 53.

In the case that for example, maintenance, etc. is carried out for the printer unit 27 and for the delivery unit 23, etc., the printer unit 27, the delivery unit 23, etc. are easily visible from the outside thereof only by removing the LSU 16 after an operator releases the engaging status of the engaging member 55 with the upper box body 11 opened up, thereby causing the maintenance, etc. to be remarkably easily carried out as an operator can insert his or her hands through between the bar-like members 44, 44.

As previously described, in the digital image forming apparatus according to the third invention, a laser scanning unit can be positioned in high precision relative to a photosensitive body, and at the same time the maintenance efficiency for the printer unit can be improved.

Furthermore, according to the digital image forming apparatus pertaining to the fourth invention, as the laser scanning unit of which mounting and fixing portion is liable to be subjected to wearing due to vibrations is fixed to bar-like members by means of engaging members, wearing due to vibrations of the laser scanning unit is produced mainly at the engaging members. Therefore, when wearing occurs, it is enough to replace only the engaging members. Accordingly, uneconomicality of replacement of an expensive laser scanning unit can be eliminated.

The present invention can be effected in force or embodied in another embodiments, without departing from the spirits thereof or the substantial features thereof. Therefore, the above preferred embodiments thereof are desirable, but the present invention is not limited only to the above embodiments.

Furthermore, it is understood that the scope of the invention claimed hereinafter and all variations or modifications which come within the scope meant by the claims are included in the claims thereof.

What is claimed is:

1. A digital image forming apparatus in which the document table and the document scanner unit of a digital image forming apparatus in which images of a document placed on a document table are read through scanning by a document scanner unit and electrostatic latent images are formed on a photosensitive body in accordance with data for the images of the document by a writing laser scanning unit arranged under the document scanner unit which is accommodated in an upper box body, the writing laser scanning unit is accommodated in a lower box body and the upper box body is opened upwards relative to the lower box body centering around a hinge unit provided at the back side thereof, and comprising a column of which one end is axially supported rotatably on the upper box body, a guide rail provided with a slide groove which, when the upper box body installed on the lower box body is moved in its opening up direction, slidably guides the other end of the column, and is formed a recess engaging with the other end of the column at the opened up position of the upper box body to limit the sliding action of the other end, and energy charging means for elastically charging energy to the column in such direction as the above other end of the column slides in the direction of the recess along the slide groove, and being further characterized in that the writing laser scanning unit is placed and positioned on a plurality of bar-like members connecting front and back side plates which constitute a frame body installed in parallelism with a drive axis center of the photosensitive body and suitably spaced therefrom in the horizontal direction above the printer unit in the frame body, and the writing laser scanning unit thereof is positioned and fixed by screws on the plurality of bar-like members by means of engaging members which are each provided with a base unit fixed with a screw on the bar-like member, an engaging piece installed at one end of the base unit for pushing and fixing the writing laser scanning unit on the bar-like member, and a positioning piece installed at the other end of the base unit and disengageably engaging with a positioning hole formed at an appointed position of the bar-like member.

* * * * *